April 2, 1940.  M. M. MATCHETT  2,195,820
MEASURING DEVICE FOR HELICAL GEARS
Filed June 1, 1937  3 Sheets-Sheet 1

INVENTOR.
Mahlon M. Matchett
BY
ATTORNEY.

April 2, 1940.  M. M. MATCHETT  2,195,820
MEASURING DEVICE FOR HELICAL GEARS
Filed June 1, 1937  3 Sheets-Sheet 2
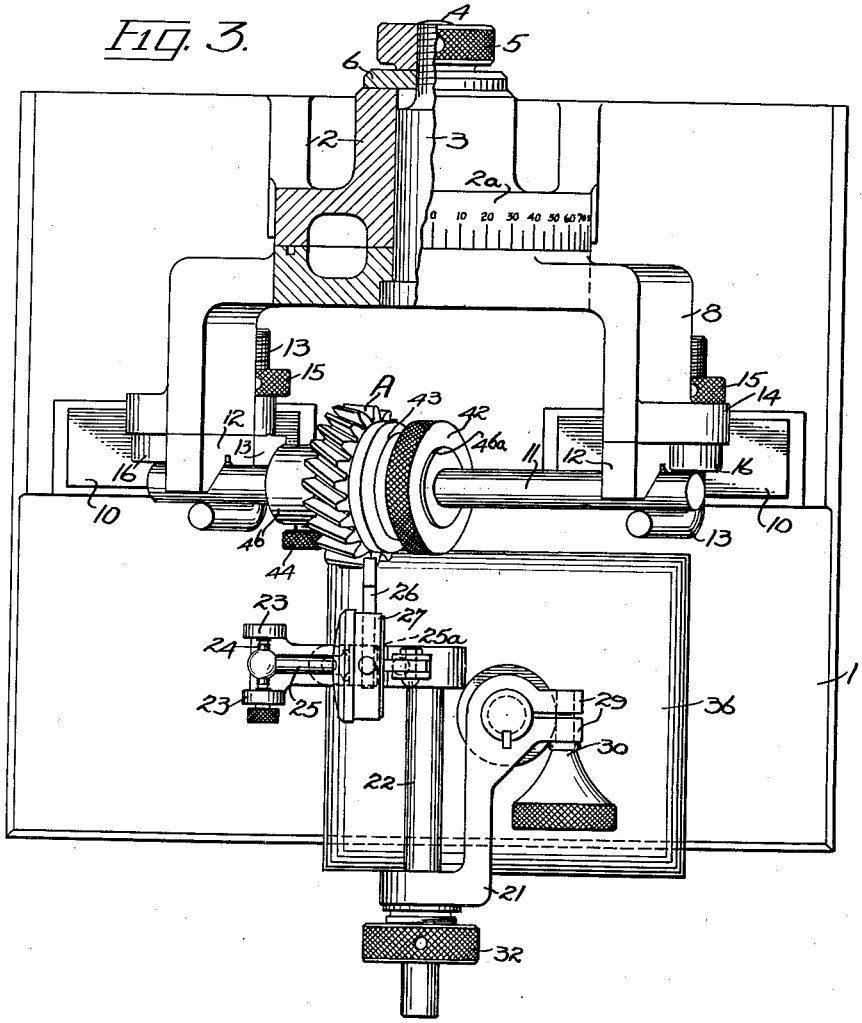
Fig. 3.
Fig. 7.
INVENTOR.
Mahlon M. Matchett
BY
ATTORNEY.

INVENTOR.
Mahlon M. Matchett
BY Gerald J. Baldwin
ATTORNEY.

Patented Apr. 2, 1940

2,195,820

UNITED STATES PATENT OFFICE 2,195,820

MEASURING DEVICE FOR HELICAL GEARS

Mahlon M. Matchett, Detroit, Mich., assignor to Le Maire Tool and Manufacturing Company, Dearborn, Mich., a corporation of Michigan Application June 1, 1937, Serial No. 145,779

5 Claims. (Cl. 33—174)

This invention relates to improvements in measuring devices for helical gears, and refers primarily to a device with which helical gears may be simply and speedily checked in one simple operation to determine whether they will satisfactorily cooperate.

At the present time it is customary to check two elements of a helical gear to determine its accuracy, namely the helix angle at the pitch diameter and the profile of the involute form of the teeth. The helix angle at the pitch diameter is checked by mounting the gear upon an arbor and moving it axially and rotating it at the same time in contact with a pointer beneath which the gear moves in a spiral path concentric with the gear axis. This, however, is alone not sufficient because the base helix angle of two gears will vary even if their helix angles at their pitch diameters are the same provided the pressure angles of their teeth differ. It will be understood, of course, that the pressure angle is the angle formed by the intersection of a line tangent to the base circle of two meshing gears with a line drawn at right angles to the common center line of the said gears. It is therefore necessary also to check the involute profile of the teeth of both gears, which is done by rolling each gear around its base circle with its profile in contact with a pointer. However, when both these somewhat tedious tests have been made and the gears found to be within manufacturing tolerances, it is still possible that a continuous bearing will not occur across the full width of two mating gear teeth. This is because the compound angle resulting from these two elements (which is commonly spoken of as the base helix angle) may not be identical due to the fact that in the two gears two slight errors (both of which are within the prescribed limits) in one gear may multiply one another in determining the base helix angle, and in the other gear may offset one another, with the result that the two gears do not work satisfactorily together.

This invention aims, among other things, to provide a helical gear measuring device which, at one quick and simple operation, will give a direct reading as to the accuracy of the base helix angle; thereby not merely doing away with the two separate and complex operations above described, but which also obviates the possibility of the occurrence of the errors above mentioned. Further if there is an error both in the helix angle at the pitch line and in the involute form of the gear teeth, and these two errors offset one another so that the base helix angle is correct, we still have a gear that will cooperate correctly with any other having the same base helix angle.

It may also be noted that in the manufacture of helical gears a tolerance of a few thousandths of an inch is permitted in the thickness of the teeth. It is therefore another object of the invention to provide a measuring device for helical gears upon which the thickness of the gear teeth will have no bearing because a somewhat thicker toothed gear can entirely satisfactorily be meshed with a gear having teeth somewhat thinner than the prescribed size.

A further object of the invention is to provide a measuring device for helical gears having an arbor swivelly mounted to receive a gear, means for setting the arbor at an inclination to offset the base helix angle of the gear, and an adjustable pointer mounted for movement across each tooth of a gear, as the latter is turned upon the arbor, across a path representing the intersection of the tooth surface with a plane tangent to the base circle of the gear. Thus it will be understood that the movement of the pointer relative a gear tooth is such that the pointer travels across the tooth along a line non-parallel to the tooth periphery.

Yet another object of the invention is to provide a measuring device for helical gears which is relatively cheap and simple to manufacture, which can be accurately set in a relatively short time, and with which, once it has been set, any number of similar gears can be quickly and effectively checked by anyone with average intelligence and no particular knowledge of gears or even of the calculations necessary to set the device.

Having thus briefly stated some of the major objects and advantages of the invention I will now proceed to describe it in detail with the aid of the accompanying drawings, in which:

Figure 3 is a plan view.

Figure 7 is a section on the line 7—7 of Figure 4.

Figure 1:
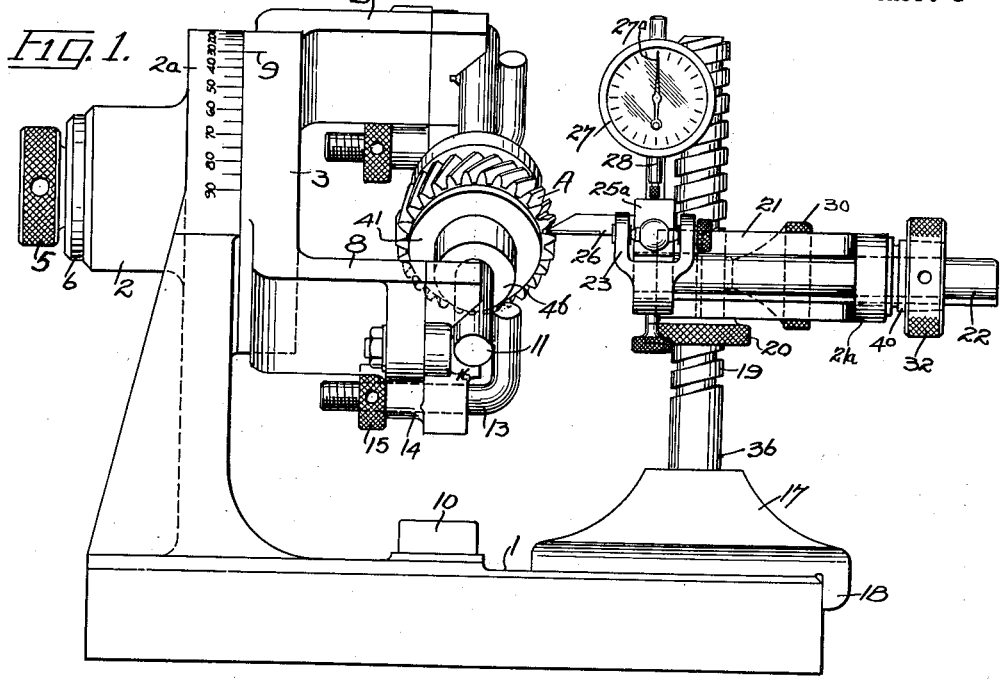
Figure 1 illustrates a side elevation of the invention.
Figure 2:
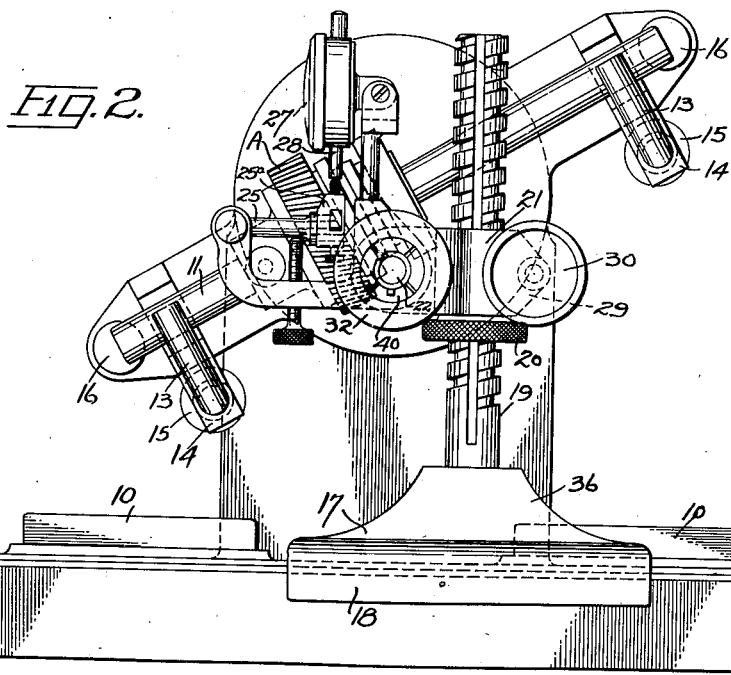
Figure 2 is a front elevation thereof.
Figure 4:
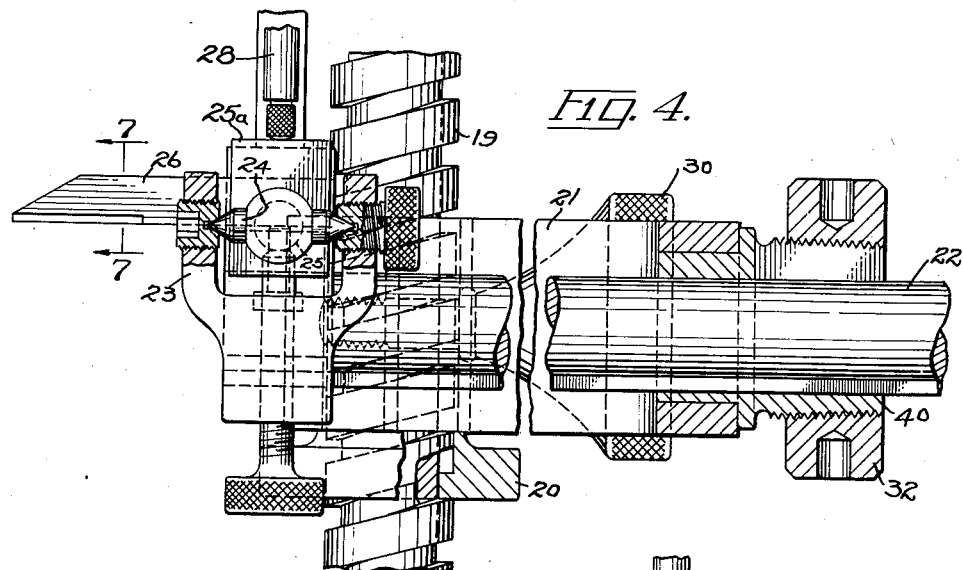
Figure 4 is an enlarged detail, partly in section, showing the mounting of the slide upon the carriage and the pointer upon the slide.

Referring to the drawings, I designates a base upwardly from which a bearing 2 projects. Swivelly mounted in the latter is a head 3 which at its rear extremity is provided with means for locking it in any desired angular position. In the present instance this locking means consists of a threaded extremity 4 upon the head 3 which receives a nut 5 that forces a washer 6 against the adjacent face of the bearing 2. The periphery of the bearing 2a is graduated to show approximate angles from the vertical center line of the bearing. Formed at each extremity of the head 3 is a forwardly projecting arm 8, and marked across the center of the head is an index mark 9 which registers with the zero index mark upon the bearing when both arms 8 are the same distance above the base 1 and above pads 10 upon the latter; one pad is provided beneath each arm 8.

The arms have aligned means for supporting an arbor 11. In this case each supporting means consists of a V-block 12 against which the arbor is held by a threaded clamp 13 which extends through an apertured lug 14 integral with the arm 8, and is tightened towards the block 12 by means of a nut 15. Provided upon each arm 8 is a button 16 the centers of which are a known and equal distance from the axis of the head 3. Moreover the centers of these buttons 16 are both exactly the same height above the base 1, and the pads 10, when the index mark 9 upon the head registers with the zero mark upon the bearing periphery 2a. The button centers, when the head 3 and its arms 8 are horizontal, are both the same distance above the base 1 and the pads 10, and also the same distance above the latter as the axis of the head 3 and the bearing 2.

Mounted for sliding movement upon the base 1 is a conventional standard 36 which is usually made as follows: The stand 17, which rests upon the base 1, is provided with a downwardly projecting lip 18 along one margin to permit ready movement of the standard across the base in a line more or less parallel with the arbor 11. Extending vertically from the stand in an upward direction is a screw 19. Carried upon a nut 20 in engagement with the latter is a carriage 21 having opposed lugs 29 thereon through which a clamping screw 30 extends to secure the carriage frictionally around the screw 19. Upon the carriage 21 a slide 22 is mounted for horizontal movement in a plane substantially parallel to the axis of the bearing 2. Around the slide 22 a collet 40 is provided which extends into the bearing 21a on the carriage 21. When the nut 40 is tightened the collet frictionally engages the slide 22 and holds it immovable. On slide 22 a yoke 23 is provided which supports the extremities of a rocking shaft 24 parallel with the line of movement of the slide. Extending at right angles from the rocking shaft 24 is an arm 25 terminating in a block 25a. From the latter a pointer 26 projects towards the arbor 11. This pointer is preferably of uniform cross section towards its outer extremity and is V-shaped across its underside as will be clearly seen from Figure 7. The underside of the pointer must lie horizontally longitudinally from the block 25a. Mounted upon the slide 22 is also a gauge 27 having a downwardly projecting spindle 28 by the axial movement of which a finger 27a on the gauge 27 is actuated. The outer extremity of the spindle 28 rests upon the block 25a so that rotation of the latter about the rocking shaft 24 moves the said spindle axially and registers such movement upon the gauge 27. Therefore deviation from a horizontal path as the pointer 26 moves across a tooth of a gear in a manner hereinafter described is registered upon the gauge.

Before describing the operation of the device it may be remarked that the only straight lines across the involute portion of any tooth of a helical gear lie along lines representing the intersection of the tooth surface with planes tangent to the base circle of the gear, and that all such lines are always straight for their entire distance across the tooth.

The helical gear to be measured is placed upon the arbor 11 between the V-blocks 12, and the clamps 13 are then secured by the nuts 15. The head 3 is then turned in the bearing 2 to an angle equal to the base helix angle of the gear to offset the latter, and then the nut 5 is tightened. An approximate setting may be obtained by turning the head 3 until the index mark 9 thereon registers with the desired angle as shown upon the bearing periphery 2a. Exact setting is obtained by locating the centers of the buttons 16 (or either of them) the correct distance above the pads 10 beneath them. The distance from the button centers to the pads equals the height of the bearing axis above the pads minus (or plus) the base helix angle of the gear times the length of the sine bar. For instance if the height of the bearing above the top of the pads is 7", the base helix angle 20°, and the length of the sine bar 6", then the distance of the two buttons above and below the horizontal bearing axis is 6" multiplied by sine 20°, which is 2.04212". Therefore the centers of the buttons are 4.95788" and 8.04212" respectively above the the pads beneath them.

Figure 5:
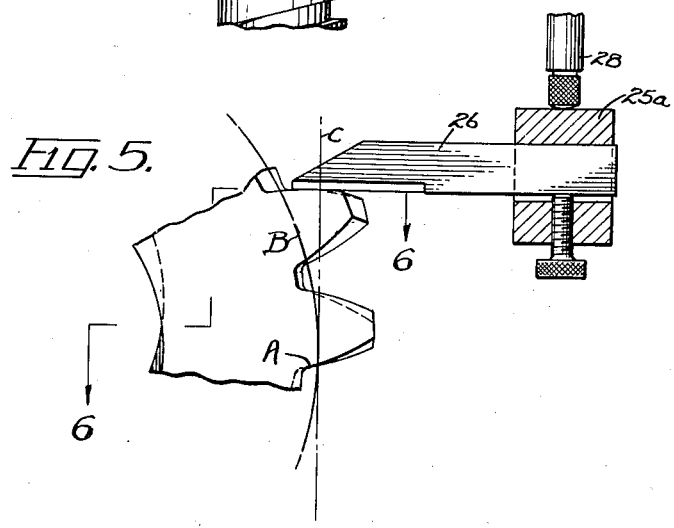
Figure 5 is a diagrammatic view showing a portion of a gear and a pointer in contact with one of the teeth thereof.
Figure 6:
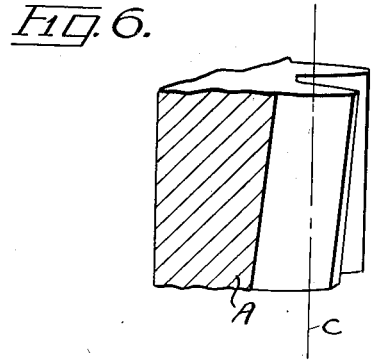
Figure 6 is a section on the line 6—6 of Figure 5.

The pointer 26 is elevated by raising the carriage 21 upon the screw 19, until its underside is level with or slightly above the intersection of a line through the axis of the gear with the point of origin of the involute of one tooth thereon. Through movement of the slide 22 the pointer is then moved inwardly across one tooth of the gear A upon the arbor 11 to the base circle of the gear or inwardly thereof. Then the standard 36 is moved along the base 1 with its lip 18 in contact with one margin of the base 1 so that the pointer travels across the tooth along a line representing the intersection of the tooth surface with a line tangent to the base circle of the gear. In the diagrammatic views shown in Figures 5 and 6, B represents the base circle of the gear, and C is a line tangent thereto which in Figure 6 is continued across a tooth of the gear. Since a line representing the intersection of the tooth surface with a line tangent to the base circle, such as the line C in Figure 6, must be a straight line if the base helix angle of the gear teeth is correct, it follows that any deviation therefrom denotes an error in the base helix angle. It will also be noted that on account of the helical form of the tooth the outer extremity of the pointer travels across it along a line non-parallel to the tooth periphery. This must be since all lines representing intersections of the tooth surface with lines tangent to the base circle must be at varying angles to the root and periphery of the teeth of the gear.

While the device may be quickly and satisfactorily be employed for checking single gears, it is of course apparent that in the case of quantity production that after the device has once been set one gear after another in rapid succession may be accurately checked, thereby saving considerable time and affording a maximum of accuracy.

It is of course understood that to check a gear thoroughly it is usually advisable to check not one but all the teeth. In order to hold the gear A immovable during the checking of each tooth I prefer that it be placed not directly upon the arbor 11 but upon a sleeve 46 on the latter. Integral with this sleeve intermediately of its length is a flange 41 against which one face of the gear A rests, and the sleeve itself is threaded externally at 46a for a short distance from one extremity. 42 denotes a collar in threaded engagement with the sleeve 46 having a flange 43 thereon which may be tightened against the other face of the gear. 44 indicates a screw extending radially through the sleeve for tightening the latter upon the arbor. This provision is made for holding lighter gears that might otherwise rotate unnoticed upon the arbor, for obviously the gear must be held against rotation as the pointer is moved across any one of its teeth.

While in the foregoing the preferred embodiment of the invention has been described and shown, it will be readily understood that many structural changes may be made thereto without departing from the spirit of the invention which is to provide a measuring device by which the base helix angle of a helical gear may be accurately checked in a single operation.

What I claim is:

1. A measuring device for the base helix angle of helical gears comprising supporting means for a helical gear, a standard adapted to be moved in a plane at an angle to the gear axis equal to the base helix angle of the gear, an arm mounted for pivotal movement on the standard about an axis normal to the axis of the gear and parallel with the plane on which said standard is adapted to be moved, and a pointer projecting laterally from the arm and adapted to be moved across an involute portion of a tooth of the gear in contact with a line thereon representing the intersection of the tooth surface with a plane tangent to the base circle of the gear, and a gauge on the standard adapted to be actuated by the pivotal movement of the pointer about the arm axis.

2. A device for measuring the base helix angle of a helical gear comprising a head mounted for rotation about a horizontal axis, supporting means for a helical gear carried by the head and rotatable therewith adapted to be set at an angle to the gear axis equal to the base helix angle of the gear, a standard movable in a horizontal plane, a vertically adjustable carriage thereon, an arm pivoted on the carriage for movement about a horizontal axis normal to the axis of the gear, a pointer extending laterally from the arm and movable with the standard in a horizontal plane, said pointer being adapted to be moved across an involute portion of a tooth of a helical gear in contact with a line thereon representing the intersection of a tooth surface with a plane tangent to the base circle of the gear, and a gauge on the carriage adapted to be actuated by movement of the pointer about the axis of the arm.

3. A device for measuring the base helix angle of helical gears comprising a head mounted for rotation about a horizontal axis, an arbor supported for rotation with the head, the arbor axis being disposed at right angles to the head axis, a standard movable in a horizontal plane, an arm pivoted on said standard about a horizontal axis normal to the axis of the gear, a pointer projecting laterally from said arm for movement with said arm about its axis, and a gauge carried by the standard adapted to be actuated by movement of the pointer about the arm axis.

4. A device for measuring the base helix angle of helical gears comprising gear supporting means, a standard adapted for movement in a plane disposed with reference to the gear axis at an angle equal to the base helix angle of the gear, a carriage supported by said standard for adjustment in a direction normal to its plane of movement, an arm pivoted on the carriage for movement about an axis lying in a plane parallel with the plane of movement of the standard and extending in a direction normal to that of the gear axis, a gear tooth feeler rigid with said arm and extending laterally away therefrom, and gauge mechanism supported by said standard in operative relation to said feeler whereby movement of the latter about the axis of the arm may be indicated.

5. A device for measuring the base helix angle of helical gears comprising gear supporting means, a standard adapted for straight line movement in a plane disposed with reference to the gear axis at an angle equal to the base helix angle of the gear, a carriage supported by said standard for adjustment in a direction normal to its plane of movement, a support adjustably positioned by said carriage for sliding movement in a direction normal to the straight line movement of said standard, an arm pivoted on the support for movement about an axis parallel to the direction of sliding movement of said support, a gear tooth feeler rigid with said arm and extending laterally away therefrom, and gauge mechanism supported by said standard in operative relation to said feeler whereby movement of the latter about the axis of the arm may be indicated.

MAHLON M. MATCHETT.